(12) United States Patent
Paulin

(10) Patent No.: US 6,909,450 B2
(45) Date of Patent: Jun. 21, 2005

(54) VIDEO ENCODING AND DECODING METHOD OF MITIGATING DATA LOSSES IN AN ENCODED VIDEO SIGNAL TRANSMITTED THROUGH A CHANNEL

(75) Inventor: Jacques Paulin, Sucy en Brie (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 348 days.

(21) Appl. No.: 10/211,896

(22) Filed: Aug. 2, 2002

(65) Prior Publication Data

US 2003/0108104 A1 Jun. 12, 2003

(30) Foreign Application Priority Data

Aug. 7, 2001 (FR) .......................................... 01 10543

(51) Int. Cl.$^7$ ................................................ H04N 7/14
(52) U.S. Cl. ................................. 348/14.01; 348/384.1
(58) Field of Search ........................ 348/14.01–14.16, 348/384.1; 379/93.01, 93.08, 93.17

(56) References Cited

U.S. PATENT DOCUMENTS

| 5,847,767 | A | * | 12/1998 | Ueda ........................ 348/423.1 |
| 2001/0028404 | A1 | * | 10/2001 | Fukuhara et al. ......... 348/384.1 |
| 2003/0093817 | A1 | * | 5/2003 | Lee ............................ 455/3.01 |

OTHER PUBLICATIONS

Error resilience/concealment Improvement of H.263 video codec for 3GPP applications; pp. 1–18, undated.

* cited by examiner

Primary Examiner—Wing F. Chan

(57) ABSTRACT

In the case of loss of data in an encoded video image cut up into slices and associated with an encoded video signal, referred to as current image, the video encoding and decoding method according to the invention allow decoding of the slices of said current image that are not affected by the loss of data, even if the image header of said current image has been lost.

13 Claims, 4 Drawing Sheets

VIDEO ENCODING AND DECODING METHOD OF MITIGATING DATA LOSSES IN AN ENCODED VIDEO SIGNAL TRANSMITTED THROUGH A CHANNEL

FIELD OF THE INVENTION

The invention relates to a method of encoding a sequence of images for supplying a sequence of encoded images, and a method of decoding said encoded images allowing in case of the loss of the image header of a current encoded image, to decode said current encoded image.

The invention also relates to an encoding system and a decoding system implementing the different steps of said encoding and decoding methods.

The invention finds numerous applications in the transmission through a channel of a video signal encoded in an environment which is subject to transmission errors.

BACKGROUND OF THE INVENTION

Currently, video compression is used in numerous applications, such as in professional applications but also oriented towards consumer applications.

Video compression is particularly used in applications of the telephony or videotelephony type, or also for audio data transmitted and exchanged between several correspondents, while simultaneously sending data of the video type. In such applications, the passband of the communication channels through which the video data are transmitted remains very limited, taking the considerable volume of the video data to be transmitted into account so as to have an acceptable quality of the images constituting the encoded video signal. It is thus necessary to make use of video compression standards adapted to small passbands, particularly to the video compression standard H.263 which is particularly dedicated to the encoding of video signals of a small format allowing generation of video signals encoded in several tens of kilobits per second.

Within the scope of applications of the telephony or videotelephony type, the video signals are transmitted through channels which are often perturbed, either because of the saturation of the passband of said channels or by transmission breaks, notably during wireless transmission, which perturbations involve loss of data in the transmitted video signals which are received by the decoder. In order to limit the effects of these perturbations, the H.263 standard provides protection of the video data constituting each image of the video signal at the level of the encoder before transmission through the transmission channels. To this end, this standard suggests that each image is cut up into slices which are encoded independently of each other. In this way, a loss of data occurring in an encoded image slice, referred to as current image, does not affect the other slices of said current image, which slices can be decoded under certain conditions. The decoding of other slices of said current image is only possible if the contents of its image header have not been lost.

The European patent having reference EP1094672 describes a method that, under certain conditions, allows to decode a current image (or only some slices of a current image) that has been lost. Indeed, this method allows in certain cases to retrieve coding parameters useful for the decoding of the current image that would have been present in the most picture header.

This known method benefits from the fact that the video standard H.263 proposes that each encoded image comprises an image header and can be cut up into slices comprising a slice header, each slice header comprising an identifier field to be identified. The identifier fields, named GFID in the syntax of this standard, comply with encoding rules defined by the following rules: the identifier fields are identical for the slices of one and the same encoded image, the identity of the image headers of a current and a preceding encoded image involves the identity of identifier fields of these two images, a change in the image header of a current encoded image with respect to that of a preceding encoded image involves the change of identifier fields of said current image.

At the decoding, if identifier fields of previous and current pictures are different, it is possible to deduce that picture headers have changed, i.e. fields composing said picture headers have changed, but it Is not possible to know which fields in particular have changed. While respecting the standard H.263, this method proposes to define additional coding rules of the GFID field to be allowed to determine when decoding which fields have changed in particular in the picture header, and to deduce the new value of these fields to be used for the current picture.

This known method is subject to limitations.

First, when identifier fields associated to the previous and current pictures are different, this known method allows to identify the change of only one field at a time in picture headers. Thus, if many fields associated to the picture headers associated to the previous and current pictures have changed, only the field considered having the highest priority will be detected y this method, and its value for the current picture will be deducted. This method that not allows to detect that many fields have changed in picture headers. As a consequence, the non-detected fields may disturb the decoding of the current picture.

Secondly, when decoding, this method proposes that the identifier field GFID(n) associated to the current picture is deducted by means of a binary operation from the identifier field GFID(n−1) associated to the previous picture, depending of the change of a set of fields having increasing priorities. The value of the identifier field GFID(n) is then obtained relatively to the identifier field GFID(n−1). When many pictures been lost, for example (n−) pictures lost, this method does not work since at the decoding the field GFID(n−1) is not available considering that the picture having rank (n−1) has been lost. A comparison between field GFID(n) and field GFID(n−i), i.e. with the identifier field associated to the last picture available, has no sense because the number of lost pictures is not known a-priori and that this pictures loss can not be planned.

Finally, when decoding, in view of determining y which available picture header the picture header of the current picture can be replaced by, a comparison is done between the identifier field GFID(n) of the current image and the identifier field GFID(n+1) of the next picture. This implies a delay equal to one picture in the decoding, which leads to a prejudice when decoding video whose visual analysis must be real-time.

OBJECT AND SUMMARY OF THE INVENTION

It is an object of the invention to propose an encoding and associated decoding method that allow, in the case of loss of the picture header in a current image, to decode the current image in a more robust manner in retrieving fields of the lost picture header.

The invention is first of all characterized in that the encoding method comprises a step of filling up each bit of the identifier fields by a value reflecting an encoding characteristic of the current encoded image.

The filing up of the value of the field identifiers is no more done relatively to the value of identifier field of the previous image. Indeed, each bit of the identifier fields are directly filled up by encoding characteristics of the image they are associated with. Many encoding characteristics are then conveyed by a given identifier field.

The invention is also characterized in that the decoding method comprises the steps of:

comparing the identifier field of the previously decoded image with the identifier field of the current encoded image, decoding said current coded image by using first the encoding characteristics comprised in the identifier field of the current encoded image if the comparison of said identifier fields does not reveal:

i) that said previously decoded image and said current encoded image are of the predicted type and that they have different formats, j) or that said previously decoded image is of the non-predicted type and said current encoded image is of the predicted type and that they have different formats.

and secondly by using encoding characteristics comprised in the image header of the previously decoded image.

By exploiting the properties of the video signal generated by means of the encoding method according to the invention, it is thus possible, in the case of loss of data during the transmission of said current image, particularly data constituting the image header of said current image, to decode image slices of said current image that are not affected by the loss of data. Indeed, by using the encoding rules and the semantics of values in each identifier field GFID, it is possible to recover information comprised in the image header of said current image, which information is necessary for decoding the image slices of said current image that are not affected by the loss of data. This has the advantage that it is not necessary to use the encoding method for systematically applying a non-predicted image in the decoding method so that the latter can perform its task, and that the transmission channel is thus not saturated. Moreover, the semantics of values defining each field GFID allows improvement of the performances of the decoding method in the case of loss of data involving irreparable decoding errors.

The decoding method according to the invention is carried out when the decoding method is in the process of interpreting the contents of the identifier fields GFID filled up during encoding of the video signal, which is easily realized by sending proprietary information for the decoding method, for example, at the start of the transmission.

The invention has the advantage that it remains compatible with the H.263 standard, with which its use can be envisaged even if all the decoding methods in accordance with the standard H.263 cannot interpret the semantics of the encoded video signal generated by means of the encoding method according to the invention.

The encoding characteristics useful for decoding the current encoded image are retrieved on the basis on a comparison of identifier fields of the current encoded image and the previously encoded image. Thus no delay are introduced in the decoding process which dedicates this method to real time applications.

The invention also relates to an encoding system implementing the different steps of the encoding method, and a decoding system implementing the different steps of this decoding method.

Regardless of the encoding or decoding level, the implementations of the encoding and decoding methods according to the invention are less costly in terms of resources, with which an application in consumer products can be envisaged.

The invention also relates to a communication system comprising an encoding system and a decoding system according to the invention.

The invention also relates to a portable telephone comprising an encoding system and a decoding system according to the invention.

The invention also relates to a video signal generated by the encoding method according to the invention.

The invention also relates to a computer program for performing one or several steps of said encoding and decoding method.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF EMBODIMENTS

The encoding method according to the invention consists of a step of filling up two bits of the identifier field GFID of each encoded image slice by respecting the encoding rules of the GFID fields imposed by the H.263 standard and by associating, with each of its bits, semantics reflecting the encoding characteristics used for encoding the images. This step of filling up the GFID fields may be performed during encoding of a sequence of uncoded video images but may also be performed on the basis of a video signal, which has been previously encoded in accordance with the H.263 standard and must be transmitted through a channel, by modifying only the value of the GFID fields.

Figure 1:
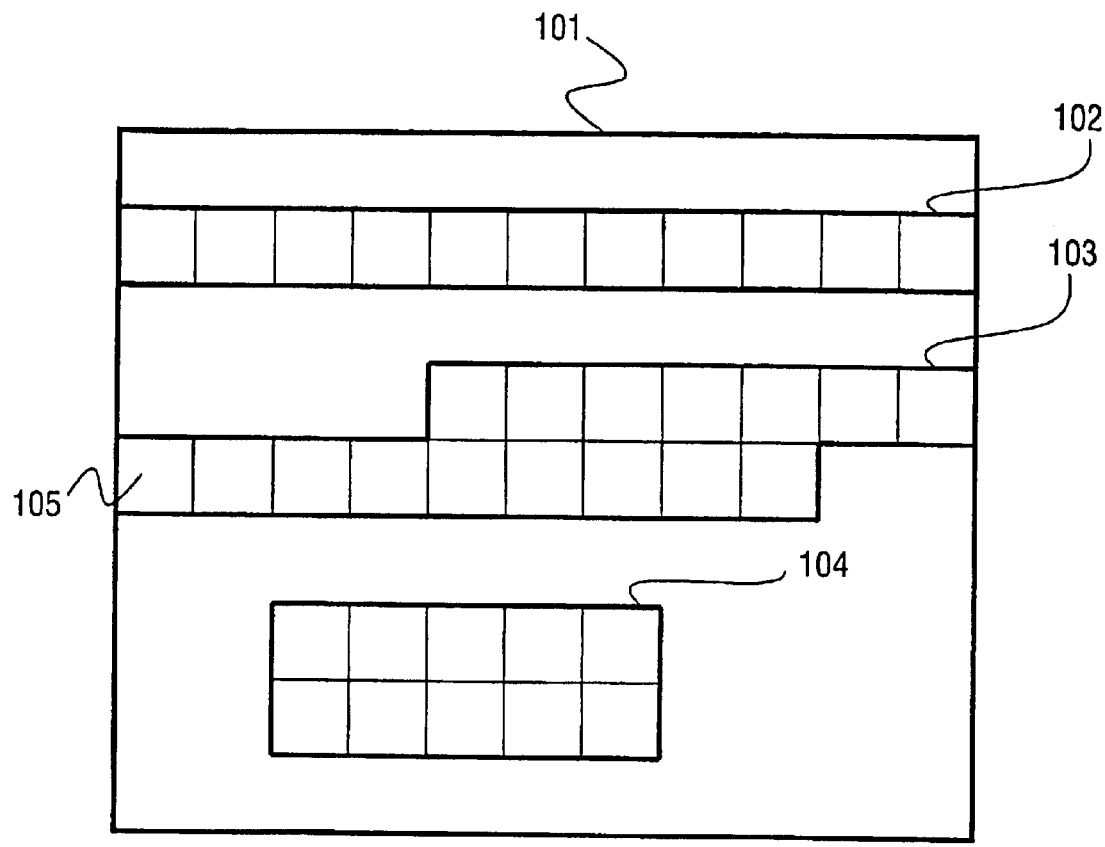
FIG. 1 shows the different types of image slices defined by the H.263 standard.

FIG. 1 shows the different types of image slices defined by the H.263 standard. By way of example, an image 101 of the QCIF format is concerned, in which image slices 102-103-104 are defined, with each slice being constituted by a set of macroblocks having a size of 16×16, such as the macroblock 105.

The image slices of the GOB type are of the type of the slice 102 corresponding to a group of macroblocks having the same width as the image and the same height as a macroblock (or several macroblocks).

The image slices of the type of the slice 104 correspond to a group of macroblocks having an arbitrary shape defined by macroblocks assembled in a connected manner.

The image slices of the type of slice 105 correspond to a group of macroblocks of a rectangular shape and parameter-dependent dimensions.

The arbitrary and rectangular shapes are defined when the appendix K of the H.263 standard is used for a field designated SSS taking a first value for the arbitrary shape and a second value for the rectangular shape.

The cut-up into image slices provides the possibility of encoding each slice of one and the same image in an independent manner.

Figure 2:
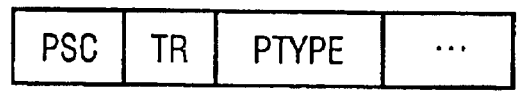
FIG. 2 shows the principal fields comprised in the image header of each encoded image in accordance with the basic profile of the H.263 standard.

FIG. 2 shows the principal fields comprised in the image header of each image encoded in accordance with the basic profile of the H.263 standard in which the encoding options cannot be used. The image header notably comprises:

the field PSC which is an image start code, the field TR which is a temporal reference incremented from image to image, the field PTYPE which is a field particularly providing information about the fact whether the encoded image is an image having the characteristic that it can unfreeze an image previously subjected to a freezing operation in the decoding method, as well as about the format of the image.

Figure 3:
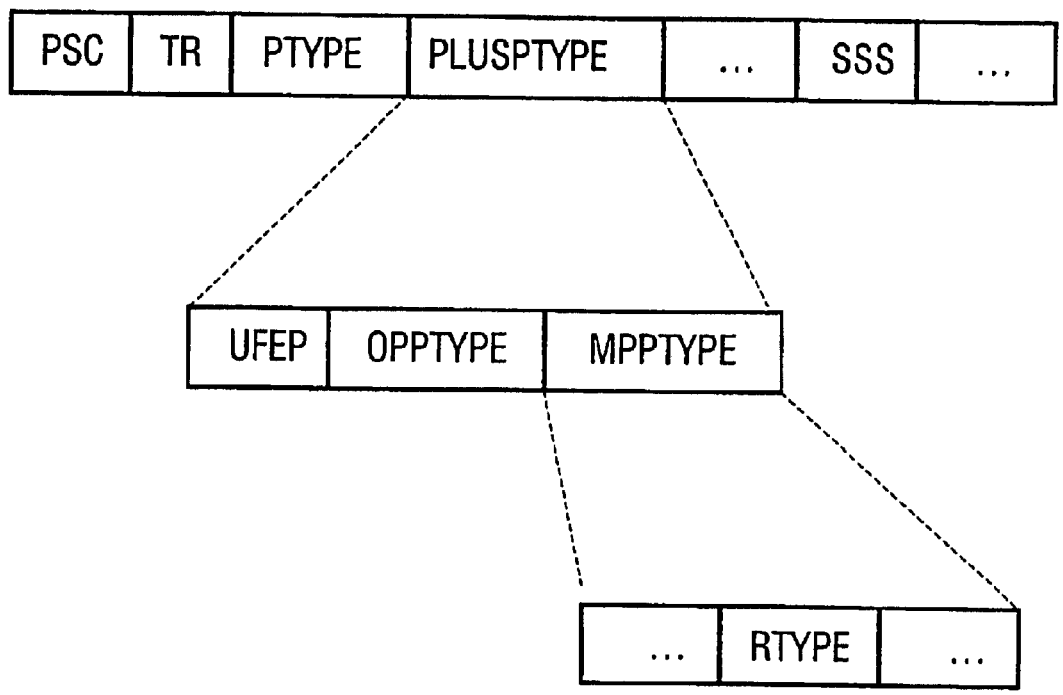
FIG. 3 shows the principal fields comprised in the image header of each encoded image in accordance with a developed profile of the H.263 standard.

FIG. 3 shows the principal fields comprised in the image header of each image encoded in accordance with a developed profile of the H.263 standard in which the encoding options can be used, which is detected by the presence of the field PLUSPTYPE. The image header comprises the fields described with reference to FIG. 2, and the field PLUSPTYPE is constituted by the following fields:

the field UFEP is a fixed length codeword of 3 bits of PLUSPTYPE field which is present only if bits 6-7-8 of PTYPE field are set to 111. When UFEP is set to "000", it indicates that only those extended PTYPE fields which need to be signaled in every picture header (MPPTYPE) are included in the current picture header. When set to "001", indicates that all extended PTYPE fields are included in the current picture header. If the picture type is INTRA or EI, this field shall be set to "001". In addition, if PLUSPTYPE is present in each of a continuing sequence of pictures, this field shall be set to "001" at least as often as specified by a five second or five picture timeout period, whichever allows a larger interval of time. More specifically, the timeout period requires UFEP="001" to appear in the PLUSPTYPE field (if PLUSPTYPE is present in every intervening picture) of the first picture header with temporal reference indicating a time interval greater than or equal to five seconds since the last occurrence of UFEP="001", or of the fifth picture after the last occurrence of UFEP="001" (whichever requirement allows a longer period of time as measured by temporal reference). Encoders should set UFEP to "001" more often in error-prone environments. Values of UFEP other than '000' and '001' are reserved.

the field OPPTYPE which particularly provides information about the format of the image and the options used for encoding the images, the field MPPTYPE whose bit 6, referred to as RTYPE, provides information about the rounding type realized during a bilinear interpolation with which half a pixel value can be computed.

Figure 4:
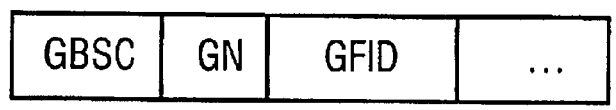
FIG. 4 shows the principal fields comprised in the image slice headers of the GOB type.

FIG. 4 shows the principal fields comprised in the image slice headers of the GOB type of each encoded image. The image slice header particularly comprises:

the field GBSC which is a start code of the image slice, the field GN which indicates the number of the first GOB of the slice in the image, the identifier field GFID.

Figure 5:
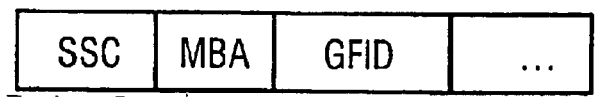
FIG. 5 shows the principal fields comprised in the image slice headers of an arbitrary or rectangular shape, FIG. 6 describes the decoding method according to the invention.

FIG. 5 shows the principal fields comprised in the image slice headers of the arbitrary or rectangular type of each encoded image. The image slice header particularly comprises:

the field SSC which is a start code of the image slice, the field MBA which indicates the address of the first macroblock in the slice, the identifier field GFID.

In order to verify the syntax rules of filling up identifier fields GFID, stipulated by the H.263 standard, and to supply an encoded video signal which is compatible with the H.263 standard, the value of the bits 1 and 2 of the fields GFID must satisfy certain constraints.

Indeed, the value of the fields GFID must be identical in each header of the group of blocks (if present) or each image slice header, in one and the same encoded image. Moreover, if the field PTYPE in the image header of a current image is the same as in the image header of the previously encoded image, the value of GFID must be identical in these two images to the extent that the field PLUSPTYPE is not used. However, if the field PTYPE in the image header of a given current image differs from the field PTYPE of the previously encoded image, the value of GFID of said current image must be different from the value of GFID of said previously encoded image. Dependent on whether the field PLUSPTYPE is present, the value of GFID of the current image must be the same as in the previously encoded image if the value of the fields (PTYPE, PLUSPTYPE, CPFMT, EPAR, CPCFC, SSS, ELNUM, RLNUM, UUI, RPSMF, RPRP as defined by the H.263 standard) remains the same as in the previously encoded image, and if not, the value of GFID must differ from that of said previously encoded image.

The encoding method according to the invention envisages two modes of filling up the fields GFID:

a first mode (mode 1) in which the format of the images encoded in accordance with the standard H.263 does not change from image to image, a second mode (mode 2) in which the format of the images encoded in accordance with the H.263 standard is susceptible to passing from a first format to a second format between two consecutive encoded images.

Table 1 gives a summary of the information by which the two bits 1 and 2 of the field GFID are filled up in the case where the format of the image does not change from image to image. In this case, this fill-up mode is referred to as mode 1.

TABLE 1

Filling up bits 1 and 2 of the field GFID in the case where the image format does not change from image to image

| | mode 1 |
|---|---|
| bit 1 of GFID | Type of image |
| bit 2 of GFID | Rounding type |
| | (for the predicted images) |
| | X |
| | (for the non-predicted images) |

Mode 1 is identified by:

mode 1:

i) the bit 1 reflects the type of image with which the field GFID to be filled up is associated. For example, the bit 1 may be set at "1" for the non-predicted encoded images (also called INTRA or I images), and at "0" for the predicted encoded images (also called INTER or P images), ii) for the predicted images, the bit 2 reflects the rounded type effected during a bilinear interpolation with which a semi-pixel value can be computed. This bit takes the value of the field RTYPE in the image header with which the field GFID to be filled up is associated. Advantageously, the value of RTYPE is changed between two consecutive predicted images so as to prevent rounded derived values and also to know whether an odd number of predicted images has been lost during the transmission. Moreover, for a current predicted image which succeeds one or several non-predicted images, the field RTYPE of said current image takes the value of the field RTYPE of the last predicted image preceding said non-predicted images so as to know whether an odd number of non-predicted images has been lost during the transmission, iii) for the non-predicted images, the bit 2 is systematically set at "0", or systematically at "1". Its value is denoted X in Table 1.

An example of filling up the bits 1 and 2 of the field GFID in accordance with mode 1 is given in Table 2 for an encoded video signal comprising 22 consecutive images.

Within the scope of the invention and for the purpose of also satisfying the syntax rules imposed by the H.263 standard for filling up the bits 1 and 2 of the fields GFID, it is conventional for mode 1 that:

the options possibly used by this standard must not be changed during encoding of the video signal, the value of the fields OPPTYPE, if present, must not be modified from image to image, the value of the fields SSS, which are present if the annex K related to cutting up the images to be encoded into slices is used, must not be changed during encoding from image to image, in the case where one or two consecutive non-predicted images are provided, the bits 3-4-5 must not be changed.

Table 3 gives a summary of the information by which the two bits 1 and 2 of the field GFID are filled up in the case where the format of the image is susceptible to changing from image to image. In this case, this fill-up mode is referred to as mode 2.

TABLE 3

Filling up the bits 1 and 2 of the field GFID in the case where the image format is susceptible to changing from image to image.

| mode 2 | |
| --- | --- |
| bit 1 of GFID | Type of image |
| bit 2 of GFID | image format |

Mode 2 is defined by:

mode 2:

i) the bit 1 reflects the type of image with which the field GFID to be filled up is associated. For example, the bit 1 may be set at "1" for the non-predicted encoded images (also called INTRA or I images), and at "0" for the predicted encoded images (also called INTER or P images). The bit 1 is then defined in a manner identical to mode 1 i), ii) the bit 2 reflects the format of the encoded image to which the field GFID to be filled up belongs, particularly if the image format is in the format QCIF (denoted Q) or SQCIF (denoted S). For example, this bit may be set at "0" for the images of the format SQCIF and at "1" for the images of the format QCIF, the image format being defined from bits 6-7-8 of PTYPE field, or from bits 1-2-3 of OPPTYPE field.

An example of filling up the bits 1 and 2 of the field GFID in accordance with mode 2 is given in Table 4 for an encoded video signal comprising 22 consecutive images.

TABLE 2

Example of filling up bits 1 and 2 of the field GFID in accordance with mode 1.

| image row | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| --- | --- | --- | --- | --- | --- | --- | --- | --- | --- | --- | --- | --- | --- | --- | --- | --- | --- | --- | --- | --- | --- | --- |
| type of image | P | I | P | P | P | P | I | P | P | P | P | P | P | P | P | I | I | P | P | I | I | P |
| bit 1 of GFID | 0 | 1 | 0 | 0 | 0 | 0 | 1 | 0 | 0 | 0 | 0 | 0 | 0 | 0 | 0 | 1 | 1 | 0 | 0 | 1 | 1 | 0 |
| bit 2 of GFID | 0 | X | 0 | 1 | 0 | 1 | X | 1 | 0 | 1 | 0 | 1 | 0 | 1 | 0 | X | X | 0 | 1 | X | X | 1 |

TABLE 4

Example of filling up bits 1 and 2 of the field GFID in accordance with mode 2.

| image row | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| --- | --- | --- | --- | --- | --- | --- | --- | --- | --- | --- | --- | --- | --- | --- | --- | --- | --- | --- | --- | --- | --- | --- |
| type of image | P | I | P | P | P | P | I | P | P | P | P | P | P | P | P | I | P | P | P | I | P | P |
| image format | Q | Q | Q | Q | Q | Q | S | S | S | S | S | S | S | S | S | Q | Q | Q | Q | Q | Q | Q |
| bit 1 of GFID | 0 | 1 | 0 | 0 | 0 | 0 | 1 | 0 | 0 | 0 | 0 | 0 | 0 | 0 | 0 | 1 | 0 | 0 | 0 | 1 | 0 | 0 |
| bit 2 of GFID | 1 | 1 | 1 | 1 | 1 | 1 | 0 | 0 | 0 | 0 | 0 | 0 | 0 | 0 | 0 | 1 | 1 | 1 | 1 | 1 | 1 | 1 |

Moreover, in order that mode 2 complies with the syntax rules imposed by the H.263 standard on filling up the bits 1 and 2 of the fields GFID:

the options possibly used by this standard must not be changed while the video signal is being encoded, the value of the fields SSS, which are present if the annex K relating to the cut-up into slices of the images to be encoded is used, must not be changed during encoding from image to image, between two consecutive predicted images and two consecutive non-predicted images of the same format, the values of the bits 3-4-5 of the fields PTYPE must not be changed during encoding of the video signal, if the fields PLUSPTYPE are used, the value of the fields UFEP and RTYPE must not be changed between two consecutive images of the same type.

Figure 6:
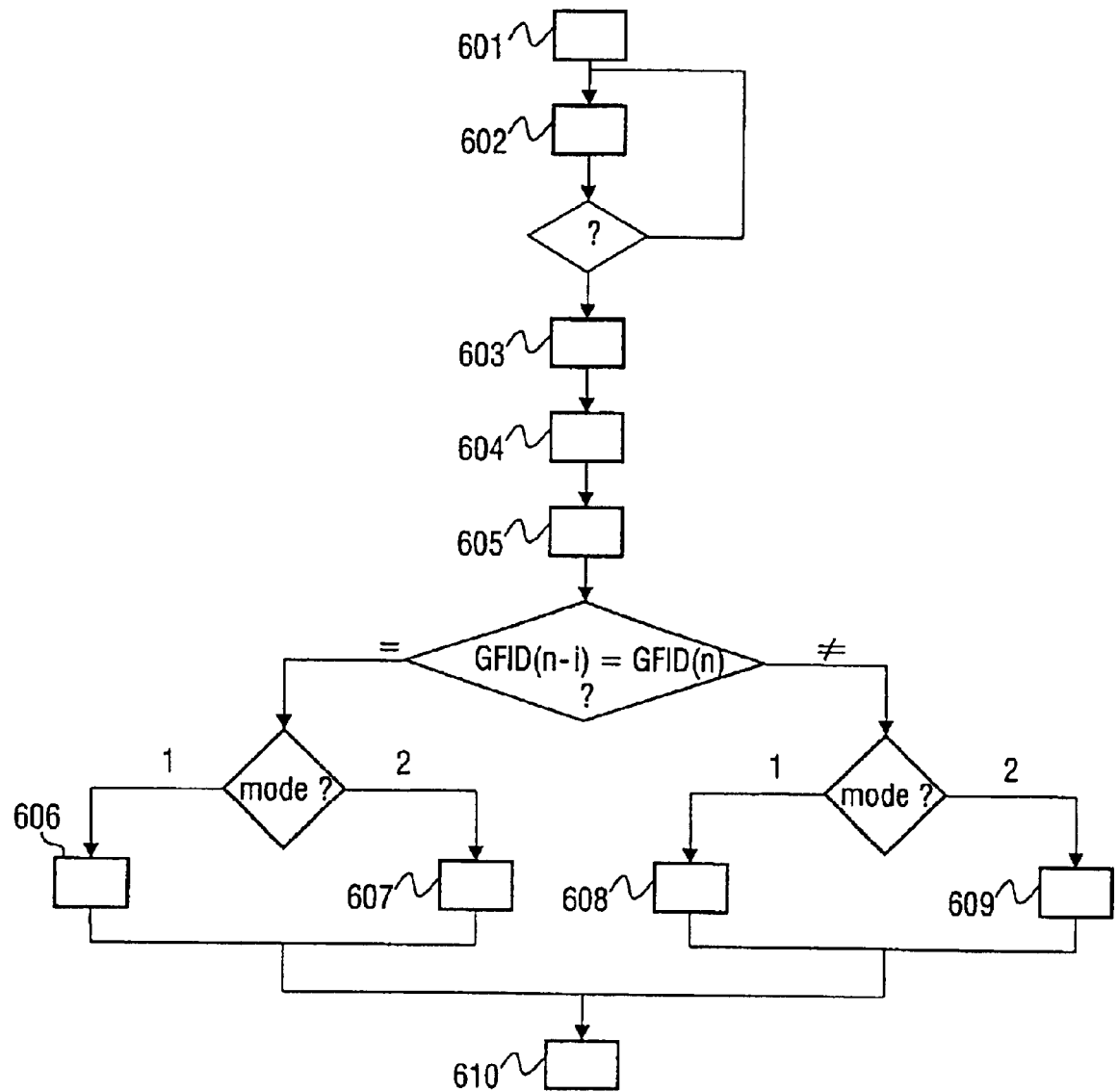

FIG. 6 describes the decoding method according to the invention, allowing, in the case of loss of data in an image, referred to as current image, decoding of the image slices of said current image which are not affected by the loss of data, even if the image header of said current image has been lost during the transmission. In the decoding method, a video signal encoded in accordance with the standard H.263 is received, in which the fields GFID have been filled up in accordance with the previously described encoding method.

Conventionally, the indices n and i allow temporal situation of the encoded images in the following descriptions. The following notations will be used:

Ima(n): encoded image of row n (i.e. current image),

Ima(n−i): encoded image of row (n−i), with i being an integer and i>0,

GFID(n): value of the field GFID for the image Ima(n),

GFID(n−i): value of the field GFID for the image Ima(n−i), image_header(n): image header of Ima(n), slice_header(n): slice header of the image of Ima(n).

This method comprises a step 601 of detection and initialization for detecting the mode in accordance with which the identifier fields GFID have been filled up and for initializing parameters of the decoding method so as to interpret whether the bits 1 and 2 of the fields GFID are in concord with that of the encoding method. This step 601 is preferably performed at the start of sending the video signal by means of the encoding method, followed by sending proprietary information of the encoding method to the decoding method reflecting the fill-up mode used. In the case where a single mode is envisaged, this initialization step is not performed and the method uses default values corresponding to this mode. In another variant of the invention, in order to allow a change of the mode in the course of the communication between the encoding method and the decoding method, a new proprietary signal reflecting the value of said new mode is sent to the decoding method in order that the latter is able to correctly interpret the fields GFID.

Permanently, the encoded video signal is scrutinized in a scrutinizing step 602 so as to mark the presence of the fields GFID in the syntax of the encoded video signal. When a field GFID is marked, its value is memorized in a memorization step 603, as well as the value of the fields of the image header of the image to which said field GFID belongs. Dependent on whether the fields GFID are always identical for one and the same image, the memorization of a single value of GFID per image is sufficient, regardless of the number of image slices per encoded image. Said memorized field GFID and image header are extracted from an encoded image of the row (n−i) which is preferably not affected at all by a loss of data and which is chronologically situated before said current image. It is thus the identifier field GFID(n−i) and the image header image_header(n−i) belonging to the image Ima(n−i) that are memorized.

In the case of a partial or total loss of the data, affecting the encoded images of the row higher than (n−i), as well as the image header of the image Ima(n), the decoding method comprises a step 604 of resynchronizing the decoding method on an image slice header, referred to as resynchronization slice, which resynchronization occurs in said current image Ima(n) to be decoded. To perform the resynchronization, the data which constitute the encoded image Ima(n) are analyzed until a code (GBSC or SSC) is marked in the encoding syntax, indicating the start of an image slice that has not been affected by the loss of data. Said resynchronization slice comprises the slice header slice_header(n) which itself particularly comprises the field GFID(n).

In a step 605, the values of GFID(n) and GFID(n−i) are compared.

In the case where GFID(n)=GFID(n−i), the decoding method is split up into two branches in accordance with the mode by which the fields GFID have been filled up. Each branch of the method allows determination of the decoding parameters which are normally present in the image header image_header(n) if this image header has not been lost, which parameters are necessary for decoding the image slices of Ima(n) that are not affected by the loss of data, or for optimizing the decoding performances of the encoded video signal:

1) mode 1: two cases are to be considered in accordance with the Ima(n−i) and Ima(n) types, the image types being given by the value of the bits 1 of the fields GFID(n−i) and GFID(n).

a) Ima(n) and Ima(n−i) are of the non-predicted type: the steps 606 allows determination of the decoding parameters of the image slices of Ima(n) by retaking the fields comprised in the field PTYPE (and PLUSPTYPE if used) of the image header image_header(n−i).

b) Ima(n) and Ima(n−i) are of the predicted type: the step 606 allows determination of the decoding parameters of the image slices of Ima(n) by retaking the fields comprised in the field PTYPE (and PLUSPTYPE if used) of the header image_header(n−i), except that the value of the field RTYPE for Ima(n) is that of the bit 2 of GFID(n) and that the hypothesis according to which the value of the bits 3-4-5 of the field PTYPE of Ima(n−i) remains identical in Ima(n) must be made.

2) mode 2: two cases are to be considered in accordance with the types of Ima(n−i) and Ima(n), the image types being given by the value of the bits 1 of the fields GFID(n−i) and GFID(n).

a) Ima(n) and Ima(n−i) are of the non-predicted type: the step 607 allows determination of the decoding parameters of the image slices of Ima(n) by retaking the fields comprised in the field PTYPE (and PLUSPTYPE if used) of the header image _header(n−i).

b) Ima(n) and Ima(n−i) are of the predicted type: ditto 2) a), i.e. the step 607 allows determination of the decoding parameters of the image slices of Ima(n) by retaking the fields comprised in the field PTYPE (and PLUSPTYPE if used) of the header image_header(n−i), additionally with the field RTYPE which must be fixed at an arbitrary value by means of the decoding method.

In the case where GFID(n)≠GFID(n−i), the decoding method is split up into two branches in accordance with the mode by which the fields GFID have been filled up. Each branch of the method allows determination of the decoding parameters which are normally present in the header image_header(n) if this header has not been lost, which parameters are necessary for decoding the image slices of Ima(n) that are not affected by the loss of data, or for optimizing the decoding performances of the encoded video signal:

3) mode 1: three cases are to be considered in accordance with the types of Ima(n−i) and Ima(n), the image types being given by the value of the bits 1 of the fields GFID(n−i) and GFID(n).

a) Ima(n) and Ima(n−i) are of the predicted type: the step 608 allows determination of the decoding parameters of the image slices of Ima(n) by retaking the fields comprised in the field PTYPE (and PLUSPTYPE if used) of the header image_header(n−i), except that the value of the field RTYPE for Ima(n) is that of the bit 2 of GFID(n). However, the hypothesis in accordance with which the value of the bits 3-4-5 of the field PTYPE of Ima(n−i) remains identical in Ima(n) must be made.

b) Ima(n) is of the predicted type and Ima(n−i) is of the non-predicted type: ditto 3) a), i.e. the step 608 allows determination of the decoding parameters of the image slices of Ima(n) by retaking the fields comprised in the field PTYPE (and PLUSPTYPE if used) of the header image_header(n−i), except that the value of the field RTYPE for Ima(n) is that of the bit 2 of GFID(n). However, the hypothesis in accordance with which the value of the bits 3-4-5 of the field PTYPE of Ima(n−i) remains identical in Ima(n) must be made.

c) Ima(n) is of the non-predicted type and Ima(n−i) is of the predicted type: the step 608 allows determination of the decoding parameters of the image slices of Ima(n) by retaking the fields comprised in the field PTYPE (and PLUSPTYPE if used) of the header image_header(n−i). However, the hypothesis in accordance with which the value of the bits 3-4-5 of the field PTYPE of Ima(n−i) remains identical in Ima(n) must be made. The bit 2 of GFID(n) must not be taken into consideration.

4) mode 2: four cases are to be considered in accordance with the types of Ima(n−i) and Ima(n), the image types being given by the value of the bits 1 of the fields GFID(n−i) and GFID(n).

a) Ima(n) and Ima(n−i) are of the predicted type: the step 609 does not allow determination of the decoding parameters of the image slices of Ima(n) by retaking the fields comprised in the field PTYPE (and PLUSPTYPE if used) of the header image_header(n−i). Indeed, this case does not only signify that a non-predicted image has been lost between Ima(n) and Ima(n−i), but also that the format has changed, impeding the decoding of Ima(n). This case corresponds to an irreparable loss of data. In contrast, the detection of this case is used advantageously for rapidly triggering a request by the decoding method so as to request the encoding method to send a non-predicted refreshing image.

b) Ima(n) and Ima(n−i) are of the non-predicted type: this case signifies that the format has changed. The step 609 allows determination of the decoding parameters of the image slices of Ima(n) by retaking the fields comprised in the field PTYPE (and PLUSPTYPE if used) of the header image_header(n−i), except that the format used for decoding the slices of Ima(n) is derived from the value of the bit 2 of GFID(n).

c) Ima(n) is of the predicted type and Ima(n−i) is of the non-predicted type: if the bits 2 of GFID(n) and GFID (n−i) are different, the situation 4) a) occurs again. In contrast, if the bits 2 of GFID(n) and GFID(n−i) are identical, the situation 3) a) occurs again.

d) Ima(n) is of the non-predicted type and Ima(n−i) is of the predicted type: if the bits 2 of GFID(n) and GFID (n−i) are different, this signifies a change of format. The step 609 allows determination of the decoding parameters of the image slices of Ima(n) by retaking the fields comprised in the field PTYPE (and PLUSPTYPE if used) of the header image_header(n−i), except that the format used for decoding the slices of Ima(n) is derived from the value of the bit 2 of GFID(n). If the bits 2 of GFID(n) and GFID(n−i) are identical, the step 609 allows determination of the decoding parameters of the image slices of Ima(n) by retaking the fields comprised in the field PTYPE (and PLUSPTYPE if used) of the header image_header(n−i).

It is thus possible to extract, from the field PTYPE (and PLUSPTYPE if used), of the memorized header image_header(n−i), fields which are necessary for decoding said resynchronization slice and subsequent image slices belonging to Ima(n). It should be noted that the decoding of said subsequent image slices is possible to the extent where they are not themselves affected by a loss of data, in which case the decoding method would restart the method from step 602. In other words, in addition to the information concerning the current image type carried by the bit 1 of GFID(n), the format of the current image or the rounded type carried by the bit 2 of GFID(n), the other encoding characteristics of the current image Ima(n) necessary for its decoding, in particular knowledge of the encoding options of the standard H.263 used during encoding of the video signal which must be taken into account, are extracted from the picture header of the picture Ima(n−i).

With a view to the different cases which are possible in accordance with the modes 1 and 2 described hereinbefore, it appears that the encoding characteristics of the previously decoded image can be used for decoding the current image if the comparison 605 of the identifiers does not reveal that:

said previously decoded image and said current image are of the predicted type and have different formats, or the previously decoded image is of the non-predicted type and said current image is of the predicted type and have different formats.

Indeed, it is only possible to decode a current image of the predicted type only if the latter can be supported by a previously decoded image of the same format. It is recalled that the passage from a first format to a second format can be particularly effected by sending a non-predicted image having said second format as its format.

In contrast, if the comparison step 605 of the identifiers reveals that:

said previously decoded image and said current image are of the predicted type and have different formats, or said previously decoded image type is of the non-predicted type and said current image is of the predicted type and have different formats, the decoding method may in this case advantageously request an image of the non-predicted type from the encoding method, before that the decoding method attempts to decode the current image.

Finally, after determination of the decoding parameters in accordance with one of the steps 606-607-608-609, the decoding step 610 decodes the slices of the current image Ima(n) in accordance with the decoding method of the H.263 standard by using said decoding parameters.

Figure 7:
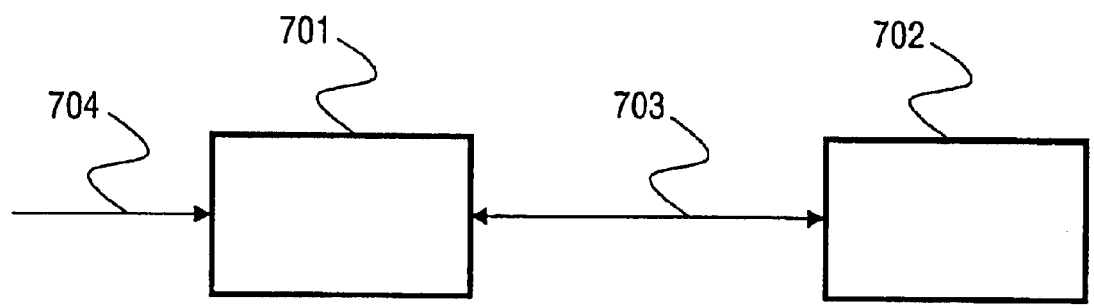
FIG. 7 illustrates a first application of the invention.

FIG. 7 shows diagrammatically a first application of the invention, which is a communication system comprising an encoding system 701 and a decoding system 702 exchanging data via the transmission channel 703 which is, for example, of the wireless or telegraphic type.

The encoding system 701 comprises encoding means with which the previously described encoding method according to the invention can be carried out on the images of the video input signal 704, the video signal 704 being either a video signal which has been previously encoded in accordance with the standard H.263, or an original uncoded video signal. In the latter case, the encoding system comprises an encoder in accordance with the standard H.263, functioning simultaneously with means for carrying out the encoding method according to the invention. The encoding system supplies a video signal on the channel 703, which is encoded in accordance with the standard H.263 whose fields GFID of each encoded image slice are filled up in accordance with said encoding method. After reception of said encoded video signal and in the case of loss of data in the transmission channel 703 leading to the loss of the image header of a current image, the receiver comprising means for carrying out the decoding method according to the invention, allows recovery of the encoding characteristics that have been lost so that the image slices of said current image that are not affected by the loss of data can be decoded by a decoder in accordance with the H.263 standard implemented in said decoding system.

Concerning the means for carrying out such an encoding and decoding methods, it will particularly make as much use of signal processors at the level of the encoding system and at the level of the decoding system, which processors performing the different steps described hereinbefore on the video signals by executing sets of instructions stored in a memory.

Figure 8:
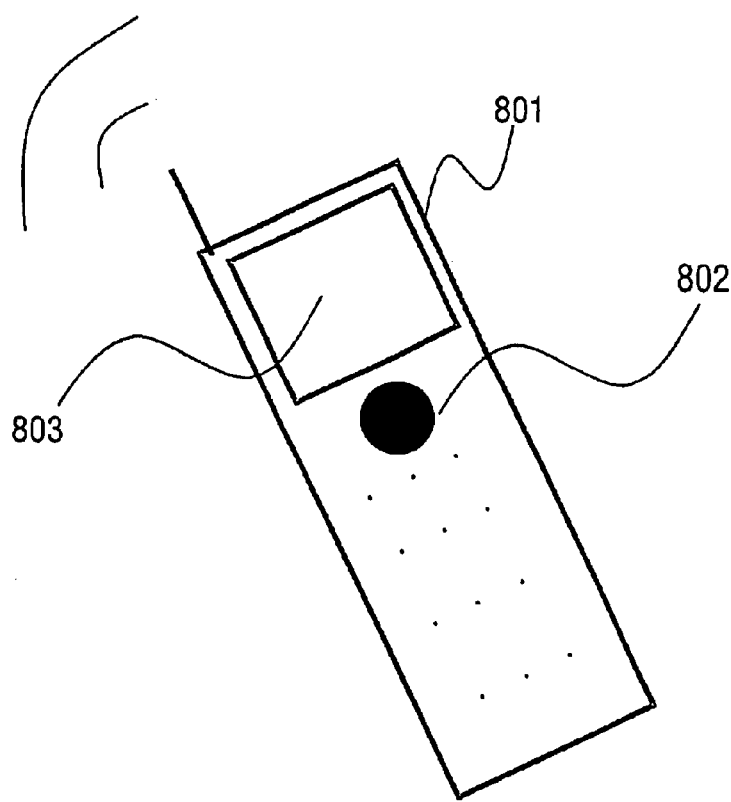
FIG. 8 illustrates a second application of the invention.

FIG. 8 illustrates a second application of the invention in which the encoding method and the decoding method are implemented in a portable telephone 801 providing the possibility of functioning either in transmission or in reception with a telephone of the same type. This telephone integrates a camera 802 supplying an original uncoded video signal allowing, for example, the person in the possession of said telephone to be filmed. This telephone comprises an encoder in accordance with the H.263 standard functioning simultaneously with encoding means according to the invention so as to supply an encoded video signal whose fields GFID reflect the characteristics of the encoding method according to the invention.

When this telephone functions in reception, after reception of an encoded video signal generated and transmitted by a telephone according to the invention functioning in transmission, and in the case of loss of data during the transmission leading to the loss of the image header of a current image, the image slices of said current image that are not affected by the loss of data are decoded by a decoder in accordance with the standard H.263 by using the encoding characteristics that have been lost and recovered by means of the decoding method according to the invention. The decoded images are displayed on the screen 803.

Advantageously, this type of telephone is used in the context of a transmission of data, particularly of the video type encoded in accordance with the H.263 standard, through a transmission network of the UMTS type.

What is claimed is:

1. A method of encoding a sequence of images, the method comprising the steps of:
   receiving the images;
   encoding the images, wherein each encoded image includes an image header having slices comprising a slice header, each slice header having an identifier field, wherein the identifier fields are identical for the slices of a particular encoded image; and
   populating each bit of the identifier fields by a value reflecting an encoding characteristic of the current encoded image.

2. A method of decoding a current encoded image forming part of a sequence of encoded images comprising each one an identifier field, each bit of the identifier fields reflecting an encoding characteristic of the current encoded image, the decoding method comprises the steps of:
   comparing the identifier field of the previously decoded image with the identifier field of the current encoded image,
   decoding said current coded image by using first the encoding characteristics comprised in the identifier field of the current encoded image if the comparison of said identifier fields does not reveal:
   i) that said previously decoded image and said current encoded image are of the predicted type and that they have different formats,
   j) or that said previously decoded image is of the non-predicted type and said current encoded image is of the predicted type and that they have different formats,
   and secondly by using encoding characteristics comprised in the image header of the previously decoded image.

3. A method as claimed in claim 1, wherein a first bit of the identifier fields reflects the image type of encoded images, and a second bit of the identifier fields reflects the rounded type used for the encoding of images.

4. A method as claimed in claim 1, wherein a first bit of the identifier fields reflects the image type of encoded images, and a second bit of the identifier fields reflects the image format of encoded images.

5. A system for encoding a sequence of images, the system comprising:
   a processor for (1) receiving the images and (2) encoding the images, wherein each encoded image includes an image header having slices comprising a slice header, each slice header including an identifier field, wherein the identifier fields are identical for the slices of a particular encoded image, and wherein each bit of the identifier fields are popluated by a value reflecting an encoding characteristic of the current encoded image.

6. A system for decoding a current encoded image forming part of a sequence of encoded images comprising each one an identifier field, each bit of the identifier fields reflecting an encoding characteristic of the current encoded image, wherein the system for decoding comprises:
   means for comparing the identifier field of the previously decoded image with the identifier field of the current encoded image,
   means for decoding said current coded image by using first the encoding characteristics comprised in the identifier field of the current encoded image if the comparison of said identifier fields does not reveal:
   i) that said previously decoded image and said current encoded image are of the predicted type and that they have different formats, j) or that said previously decoded image is of the non-predicted type and said current encoded image is of the predicted type and that they have different formats.

7. A communication system comprising a decoding system as claimed in claim 6.

8. A portable telephone comprising a decoding system as claimed in claim 6.

9. A video signal, for use with a receiver, the video signal comprising: a sequence of encoded images for reception by the receiver, the encoded images having slices, each slice having an identifier field populated by values reflecting the encoding characteristics of said encoded image, wherein, an identifier field being identical for the slices of particular image, an identity of the encoding characteristics of a current and a preceding image uses the identity of the identifier fields of these two images, a change of the encoding characteristics of a current image with respect to those of a preceding image involves a change of the identifier fields of said current image, a first value of the identifier fields reflecting the type of encoded image, a second value of the identifier fields reflecting the image format of the encoded image or the rounded type.

10. A computer readable medium comprising program code instructions for performing a method as claimed in claim 1.

11. The system of claim 5, wherein the identity of the image headers of a current and a preceding encoding image uses the identity of identifier fields of the current and preceding images, and wherein a change in an image header of a current encoded image with respect to a preceding encoded image involves a change of the identifier fields of said current encoded image.

12. A method of decoding encoded images, the method comprising the steps of:

receiving the encoded images, which form a sequence of encoded images, each image including an identifier field and each bit of the identifier field relating to an encoding characteristic of the encoded image;

comparing the identifier field of a previously decoded image with the identifier field of the encoded image, decoding said encoded image using the comparison of encoding characteristics in the identifier fields of the encoded image and the previously decoded image.

13. The method of claim 12, wherein the decoding step includes determining whether the previously decoded image and the encoded image (1) are of the predicted type or non-predicted type and (2) have different formats.

* * * * *